Feb. 27, 1951     F. W. WEHMILLER ET AL     2,543,142
CONVEYER
Filed July 22, 1948     2 Sheets-Sheet 1
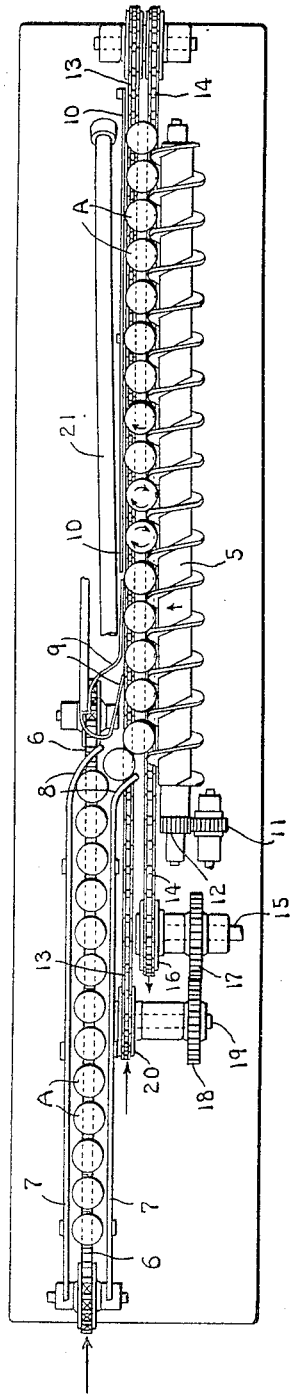
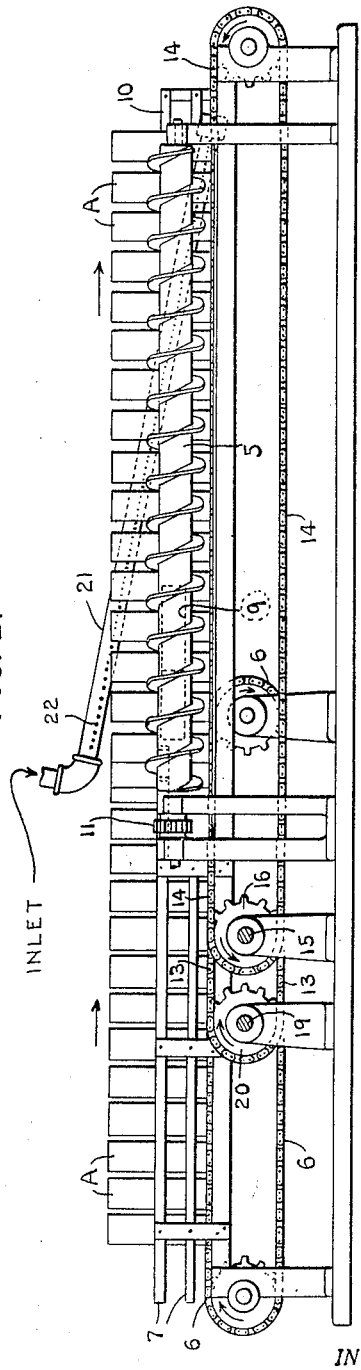
INVENTORS:
F. W. WEHMILLER
W. J. NEKOLA
P. H. SPELBRINK
BY Albert J. McCauley
ATTORNEY.

Feb. 27, 1951 F. W. WEHMILLER ET AL 2,543,142
CONVEYER
Filed July 22, 1948. 2 Sheets-Sheet 2

INVENTORS:
F. W. WEHMILLER
W. J. NEKOLA
P. H. SPELBRINK
BY Albert J. McCauley
ATTORNEY.

Patented Feb. 27, 1951

2,543,142

UNITED STATES PATENT OFFICE 2,543,142

CONVEYER

Frederick W. Wehmiller, Ladue, William J. Nekola, Normandy, and Paul H. Spelbrink, St. Louis, Mo., assignors to Barry-Wehmiller Machinery Company, St. Louis, Mo., a corporation of Missouri Application July 22, 1948, Serial No. 40,074

14 Claims. (Cl. 198—33)

This invention relates to conveyors, and more particularly to a machine for rotating traveling articles. Various different advantages may be obtained from a machine of this kind. For example, the rotating articles can be conveniently subjected to forcible washing or drying operations while in transit, or said articles may be washed and then subjected to a drying operation. One type of apparatus for drying articles, wherein the novel conveyor of the present invention is employed to advance and rotate the articles being dried, is shown in co-pending application Serial No. 790,288, now Patent Number 2,501,367. Another use of the machine appears in the spraying of liquid solutions onto exposed faces of the rotating articles to form a coating thereon, or to merely provide for sterilization of the exposed faces. Many other kinds of operations can be conveniently performed upon the rotating articles while they are traveling along a machine of this kind.

Furthermore, instead of subjecting the traveling articles to a selected treatment, the machine can be employed to expose the articles to an inspector, said articles being rotated to expose their side and top faces while the conveyor moves them to and away from a position where the inspector is stationed. In some cases, the rotary motion has an advantage in mixing the contents of traveling containers.

In commercial practice the invention is quite desirable for use in the transmission of upright containers, such as cans, bottles, jars and the like, from one machine to another, the traveling containers being rotated for inspection, or for special operations while in transit between the machines.

To illustrate a desirable form of the invention, we will describe a specific combination and arrangement of details shown in the accompanying drawings, with the understanding that the scope of the invention is to be determined by relatively broad terms employed in the claims hereunto appended.

Fig. 1 is a top or plan view of a machine embodying features of this invention.

Fig. 2 is a side view, partly in section.

Figure 3:
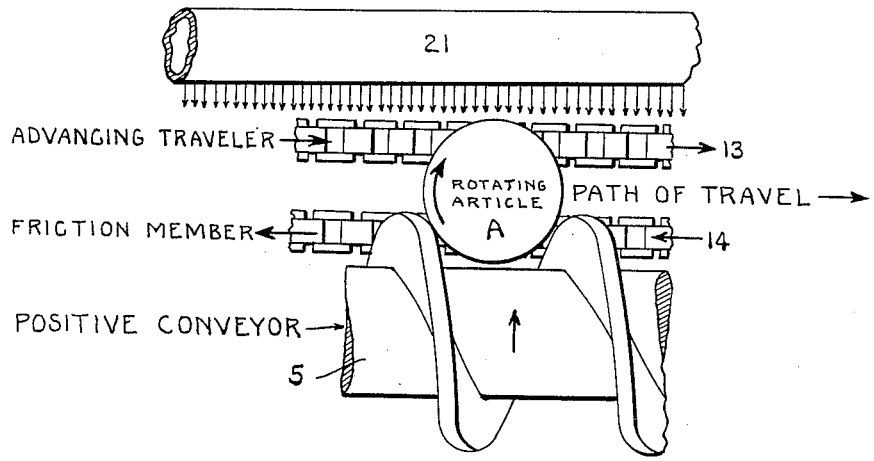
Fig. 3 is a diagrammatical top view showing various cooperative conditions of the invention.

The device herein shown to illustrate a desirable form of the invention comprises an approximately horizontal screw conveyor 5 to positively transmit upright articles A through an elongated horizontal path. The articles are advanced by a pushing action of this conveyor and it will be observed that any other suitable conveying means may be employed for this purpose. However, the positive conveyor should be associated with a means for rotating the traveling articles.

To illustrate a suitable means for feeding the articles to the zone of rotation, we have shown a traveling conveyor 6 on which the articles are loosely seated, and guides 7 located above opposite sides of said conveyor. These guides have curved ends 8 to deflect the articles from the conveyor 6 to the entrance of the screw conveyor 5. A spring device 9 is located opposite said entrance to yieldably hold the incoming articles and provide for successive delivery of said articles to the screw conveyor.

This screw conveyor 5 is located at one side of the elongated path to contact with sides of the upright articles and positively push them along said path. Suitable guides 10 may be located at the opposite side of said path to retain the articles in contact with the screw conveyor. In Fig. 1 we have shown gear members 11 and 12 to rotate the screw conveyor, but any other suitable driving device may be employed to advance the articles at a predetermined speed.

At the bottom of the elongated zone of rotation we have shown a traveling friction track device 13 associated with the screw conveyor 5 to aid in advancing the articles, the bottoms of the upright articles being seated on said traveling track device 13. In the same horizontal area we have shown a second traveling friction track device 14 contacting with bottoms of said articles, said second traveling friction track device 14 being in a plane between the axis of the screw conveyor 5 and the traveling friction track device 13.

These friction devices 13 and 14 may be in the form of sprocket chains traveling in opposite directions. For example, in Fig. 1 we have shown a drive shaft 15 fixed to a sprocket wheel 16 which drives the upper portion of sprocket chain 14 in a direction opposite to the travel of articles A. In this diagrammatical illustration, the drive shaft 15 is provided with a gear wheel 17 meshing with a gear wheel 18 on a shaft 19 provided with a sprocket wheel 20 which drives the upper portion of the chain 13 in the direction of travel of the articles A.

The sprocket chains 13 and 14 are to be regarded as friction track members which loosely support the traveling articles, while a positive conveyor is employed to push said articles along a path of travel indicated by an arrow in Fig. 3. Said sprocket chains may be driven at the same speed or at different speeds to provide for rotation of the traveling articles. In fact, more or less desirable rotation of the articles would occur if the friction track device formed by the chain 14 were held in a stationary position while the chain 13 is advanced at a speed desired for rotation of the traveling articles. All that is necessary is that relative longitudinal movement be given to the two friction tracks. That is, the friction tracks may be moved longitudinally in opposite directions, or one track may be held stationary while the other is moved longitudinally, or both tracks may be moved longitudinally in the same direction but at markedly different rates.

As a specific illustration of details found in one of our commercial machines, without in any way limiting the invention to such details, we have advanced the track member 13 at a speed of about 150 feet per minute, at the same time moving the companion track member 14 in the opposite direction at the same speed of about 150 feet per minute, while moving the screw conveyor 5 to positively advance the articles at a speed of about 72 feet per minute.

Similar results may be accomplished by increasing the speed of the advancing track member 13, while holding the frictional track member 14 in a fixed position.

For the purpose of discharging air or liquid onto outer faces of the rotating articles, we have shown an inclined duct 21 having an approximately continuous elongated outlet 22 extending downwardly along one side of the zone of rotation, so as to discharge a selected fluid onto the rotating articles.

Figure 4:
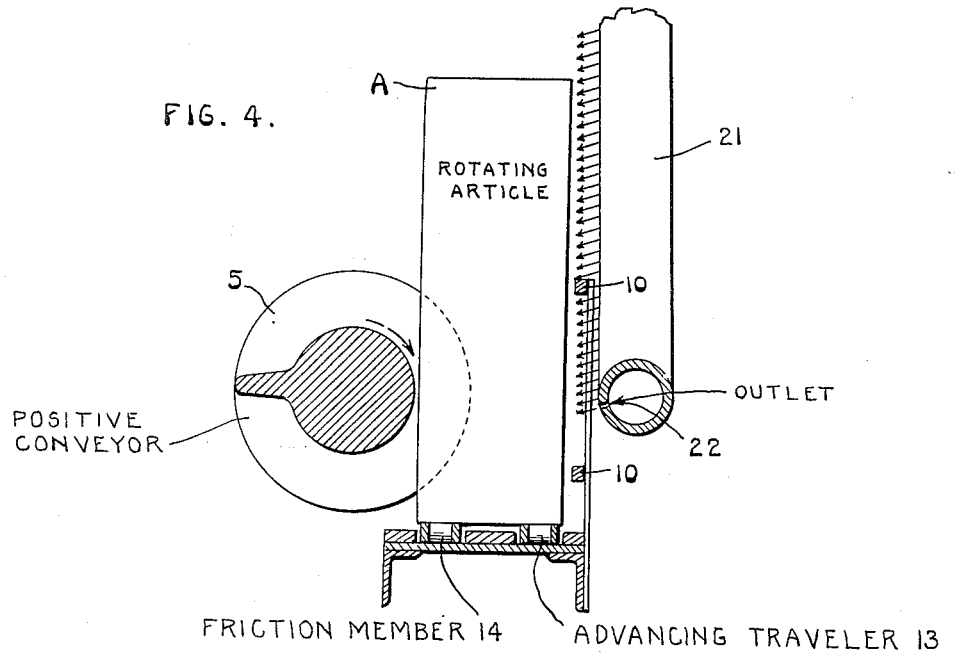
Fig. 4 is a similar illustrative diagram which may be regarded as a vertical section, taken approximately through the middle of Fig. 3.

As shown most clearly in Figures 3 and 4, the traveling friction track devices 13 and 14 provide seats for marginal bottom portions of the upright articles A, so as to rotate said articles around their vertical axes, said friction devices being at opposite sides of said axes, or at opposite sides of the center line of the path of travel of the articles.

The articles preferably travel in an approximately straight horizontal path, and they are positively separated from each other by means of the successive convolutions of the helical conveyor 5. It will be noted that the helical element of the conveyor 5 constitutes pusher means to engage and loosely confine the upright articles A at points above the track members 13 and 14. Such positive separation is desirable to permit free rotation of the articles. If the rotating articles were crowded into contact with each other, their contacting circular faces would have to turn in opposite directions, and such contacts would tend to prevent the desired rotation. Furthermore, by positively separating the articles, we provide spaces for effective delivery of fluid from the duct 21 to opposite sides of the articles, or to more fully expose the articles to an inspector.

When a spiral conveyor is employed to advance the articles, the spiral pushing faces contacting with the articles preferably move downwardly, as indicated by an arrow in Fig. 4. This action has a tendency to force the articles into contact with the traveling friction members 13 and 14, and in some cases the downwardly moving pushing faces of the conveyor will have more or less value in removing foreign matter from the articles. Regardless of the direction in which the spiral convolutions of the helical conveyor 5 travel, it will be noted that the convolutions enter into the space above the track members 13 and 14 and, in passing through said space, engage the upright articles A at points above the track members, as seen in Figs. 3 and 4.

We claim:

1. In a machine for simultaneously advancing upright articles along a substantially horizontal path and rotating said articles each about its vertical axis as they are advanced, the combination of a pair of parallel substantially horizontal frictional track members spaced apart to support said articles in upright position, a conveyor including pusher means arranged to engage said articles at points above said tracks to advance said articles along said tracks, and driving means for imparting relative longitudinal movement to said frictional track members, whereby said upright articles are caused to rotate as they are advanced by said conveyor.

2. In a machine for simultaneously advancing upright articles in a substantially horizontal path and rotating said articles each about its vertical axis as they are advanced, the combination of a pair of parallel sprocket chains spaced apart to support said articles in upright position, a conveyor including means for loosely embracing each successive upright article at a point above said sprocket chains and advancing said articles along said chains, means for driving said conveyor, and driving means for moving said chains longitudinally in opposite directions, the chain moving in the direction of travel of said article being driven at a speed substantially higher than the rate of advance of said articles.

3. In a machine for simultaneously advancing upright articles along a substantially horizontal path and rotating said articles each about its vertical axis, the combination of a pair of parallel substantially horizontal frictional track members spaced apart to support said articles in upright position, a conveyor including means for loosely embracing each successive upright article at a point above said track members to advance said articles along said track members, means for driving said conveyor, and means for imparting relative longitudinal movement to said track members.

4. In a machine for simultaneously advancing upright articles along a substantially horizontal path and rotating said articles each about its vertical axis as said articles are advanced, the combination of a pair of substantially horizontal parallel frictional track members spaced apart to support said articles in upright position; a conveyor arranged beside and extending parallel to said track members, said conveyor including pusher means extending transversely of and above said track members to engage and loosely confine said upright articles at points above said track members; means for driving said conveyor to advance said articles along said track members, and means for imparting relative longitudinal movement to said frictional track members to cause each of said articles to rotate about its vertical axis as it is advanced along said track members by said conveyor.

5. In a machine for conveying cans or like upright articles in upright position and simultaneously rotating said cans or like upright articles each about its vertical axis, the combination of a pair of parallel frictional track members spaced apart to support said articles in upright position; a conveyor arranged beside and extending parallel to said track members, said conveyor including pusher means extending transversely of and above said track members to engage and loosely confine said articles at points above said track members; means for driving said conveyor to advance said articles along said track members, and means for moving said track members longitudinally in opposite directions to cause said articles to rotate as they are advanced along said track members by said conveyor.

6. A machine constructed in accordance with claim 5, including guide means arranged beside said track members on the side opposite said conveyor to cooperate with the pusher means of said conveyor in positioning said articles on said track members.

7. In a machine for advancing upright articles along a substantially straight horizontal path and simultaneously rotating said articles each about its vertical axis, the combination of a pair of parallel substantially straight horizontal frictional track members spaced apart and located one on each side of said path to provide tracks for oppositely disposed marginal bottom portions of said upright articles, a conveyor extending parallel to said track members and including pusher means arranged to engage and loosely confine said upright articles at points above said track members, means for driving said conveyor to advance said upright articles along said track members, means for moving one of said track members longitudinally in the direction of travel of said articles but at a speed substantially greater than the speed at which said articles are advanced by said conveyor, and means for moving the other of said track members longitudinally in the opposite direction.

8. In a machine for advancing upright articles along a substantially horizontal path and simultaneously rotating said articles each about its vertical axis, the combination of a pair of parallel substantially horizontal frictional track members located one at each side of said path, to provide tracks for oppositely disposed marginal bottom portions of said upright articles, a conveyor positioned generally parallel to said track members and including pusher means arranged to engage and loosely confine said articles at points above said track members, means for driving said conveyor to advance said upright articles along said track members, and means for moving one of said track members longitudinally in the direction of travel of said articles but at a speed substantially greater than the speed at which said articles are advanced, the other of said track members being maintained stationary, whereby said frictional track members provide advancing and retarding tracks, respectively, adapted to cause said articles to rotate as they are moved relative to said tracks by said conveyor.

9. In a machine for advancing upright articles along a straight substantially horizontal path and simultaneously rotating said articles each about its vertical axis, the combination of a pair of straight substantially horizontal frictional track members arranged parallel to each other and spaced one on each side of said path to receive said articles in upright position; a helical conveyor arranged parallel to said track members with the spiral convolutions of said conveyor passing through the area above said track members as said conveyor is driven, whereby adjacent spiral convolutions of said conveyor are adapted to loosely embrace one of said articles at a point above said track members to advance the article as the conveyor is driven; means for driving said conveyor, and means for imparting relative longitudinal movements to said track members.

10. In a machine for advancing upright articles along a straight substantially horizontal path and simultaneously rotating said articles each about its vertical axis, the combination of a pair of straight substantially horizontal frictional track members arranged parallel to each other and spaced one on each side of said path to provide tracks for oppositely disposed marginal bottom portions of said upright articles; a helical conveyor arranged parallel to said track members with the spiral convolutions of said conveyor passing through the area above said track members as the conveyor is driven, whereby adjacent spiral convolutions of said conveyor are adapted to loosely embrace one of said articles at a point above said track members to advance the article as the conveyor is driven; means for driving said conveyor, and means for driving said track members longitudinally in opposite directions with the track member traveling in the direction of advance of said articles being moved at a rate substantially greater than the rate of advance of said articles.

11. In a machine for advancing upright articles such as cans or the like along a straight substantially horizontal path and simultaneously rotating said articles each about its vertical axis, the combination of a pair of straight substantially horizontal frictional track members arranged parallel to each other and spaced one on each side of said path to provide tracks for oppositely disposed marginal bottom portions of said upright articles; a helical conveyor arranged beside said track members and extending parallel therewith, the spiral convolutions of said conveyor passing through the space above said track members as said conveyor is driven, whereby adjacent spiral convolutions of said conveyor are adapted to engage and loosely embrace one of said upright articles at a point above said track members; means for driving said conveyor, and means for imparting relative longitudinal movement to said track members.

12. In a machine for advancing upright articles such as cans or the like along a straight substantially horizontal path and simultaneously rotating said articles each about its vertical axis, the combination of a pair of straight substantially horizontal frictional track members arranged parallel to each other and spaced one on each side of said path to provide tracks for oppositely disposed marginal bottom portions of said upright articles; a helical conveyor arranged beside said track members and extending parallel therewith, the spiral convolutions of said conveyor passing through the space above said track members as said conveyor is driven, whereby adjacent spiral convolutions of said conveyor are adapted to engage and loosely embrace one of said upright articles at a point above said track members; guide means located beside said track members on the side opposite said helical conveyor to maintain said upright articles in engagement with the convolutions of said conveyor; means for driving said conveyor, and means for imparting relative longitudinal movement to said track members.

13. In a machine for advancing upright articles such as cans or the like along a straight substantially horizontal path and simultaneously rotating said articles each about its vertical axis, the combination of a pair of endless frictional members spaced parallel to each other one on each side of said path to provide a pair of frictional tracks for oppositely disposed marginal bottom portions of said upright articles; a helical conveyor arranged beside and parallel to said path with the spiral convolutions of said conveyor passing through the space above said tracks as said conveyor is driven, whereby adjacent spiral convolutions of said conveyor are adapted to engage and loosely embrace one of said articles at a point above said tracks; guide means located beside said tracks on the side opposite said conveyor to maintain said articles in engagement with the convolutions of said conveyor; means for driving said conveyor, and means for imparting relative longitudinal movement to said frictional members.

14. In a machine for advancing upright articles such as cans or the like along a substantially horizontal path and simultaneously rotating said upright articles each about its vertical axis, the combination of a pair of endless frictional members spaced parallel to each other one on each side of said path to provide a pair of frictional tracks for oppositely disposed marginal bottom portions of said upright articles, conveyor means for loosely engaging said upright articles at points above said frictional tracks and positively advancing said articles along said tracks, and means for imparting relative longitudinal movement to said frictional members.

FREDERICK W. WEHMILLER.
WILLIAM J. NEKOLA.
PAUL H. SPELBRINK.

REFERENCES CITED

The following references are of record in the file of this patent:

UNITED STATES PATENTS

| Number | Name | Date |
| --- | --- | --- |
| 586,866 | Potter | July 20, 1897 |
| 908,373 | Ayars | Dec. 29, 1908 |
| 931,434 | Krummel | Aug. 17, 1909 |